United States Patent
Pich

(10) Patent No.: US 9,885,161 B2
(45) Date of Patent: Feb. 6, 2018

(54) METHOD FOR LIMITING FRESHET LEVELS AND CONTROLLING FLOODS

(71) Applicant: S.P.C.M. SA, Andrezieux Boutheon (FR)

(72) Inventor: René Pich, Saint Etienne (FR)

(73) Assignee: S.P.C.M. SA (FR)

( * ) Notice: Subject to any disclaimer, the term of this patent is extended or adjusted under 35 U.S.C. 154(b) by 0 days.

(21) Appl. No.: 14/894,185

(22) PCT Filed: May 20, 2014

(86) PCT No.: PCT/FR2014/051176
§ 371 (c)(1),
(2) Date: Nov. 25, 2015

(87) PCT Pub. No.: WO2014/199037
PCT Pub. Date: Dec. 18, 2014

(65) Prior Publication Data
US 2016/0122960 A1    May 5, 2016

(30) Foreign Application Priority Data
Jun. 10, 2013 (FR) .................................. 13 55310

(51) Int. Cl.
| | |
|---|---|
| *E02B 3/02* | (2006.01) |
| *E02B 3/04* | (2006.01) |
| *E02B 1/00* | (2006.01) |
| *E02B 3/12* | (2006.01) |
| *E02B 3/16* | (2006.01) |
| *C08L 33/00* | (2006.01) |

(52) U.S. Cl.
CPC .............. *E02B 3/04* (2013.01); *E02B 1/00* (2013.01); *E02B 1/003* (2013.01); *E02B 3/02* (2013.01); *E02B 3/128* (2013.01); *E02B 3/16* (2013.01); *C08L 33/00* (2013.01)

(58) Field of Classification Search
CPC ... E02B 1/00; E02B 1/003; E02B 3/02; E02B 3/04
See application file for complete search history.

(56) References Cited

U.S. PATENT DOCUMENTS

| | | | | | |
|---|---|---|---|---|---|
| 3,118,832 | A * | 1/1964 | Katzer | ...................... | C02F 1/54 210/734 |
| 3,461,674 | A * | 8/1969 | Pye | .......................... | E02B 1/003 405/74 |
| 3,943,060 | A * | 3/1976 | Martin | ...................... | C09K 8/68 137/13 |
| 4,042,529 | A * | 8/1977 | Nimerick | .................. | C09K 8/62 166/283 |
| 4,252,706 | A * | 2/1981 | Phillips | ....................... | C08J 3/03 523/336 |
| 5,027,843 | A * | 7/1991 | Grabois | .................... | C09K 8/68 137/13 |
| 9,517,957 | B2 * | 12/2016 | Gomes De Oliveira | . | C02F 1/56 |
| 2009/0298721 | A1 * | 12/2009 | Robb | ....................... | C09K 8/12 507/209 |
| 2010/0048429 | A1 * | 2/2010 | Dobson, Jr. | ............. | E21B 43/25 507/212 |
| 2010/0324166 | A1 * | 12/2010 | Wu | .......................... | C09K 8/68 523/122 |
| 2012/0214714 | A1 * | 8/2012 | Whitwell | .................. | C09K 8/68 507/222 |
| 2013/0231429 | A1 * | 9/2013 | Sexton | ..................... | C08K 5/09 524/322 |
| 2014/0051610 | A1 * | 2/2014 | Perry | ........................ | C09K 8/68 507/226 |
| 2014/0323609 | A1 * | 10/2014 | Sexton | ................... | A01N 25/04 523/132 |

FOREIGN PATENT DOCUMENTS

| | | | | |
|---|---|---|---|---|
| BR | PI1105005 | * | 11/2012 | |
| DE | 19732106 A1 | | 1/1999 | |
| GB | 1515983 A | * | 6/1978 | ............... C08F 2/54 |
| WO | 2008107492 A1 | | 9/2008 | |

OTHER PUBLICATIONS

Physics "Focus: Polymers Improve the Flow," Dec. 1999.*

* cited by examiner

*Primary Examiner* — Frederick L Lagman
(74) *Attorney, Agent, or Firm* — Forge IP, PLLC

(57) ABSTRACT

A process for limiting the level of flooding of a watercourse, notably a wide river, a narrow river and/or one of its tributaries, consisting of injecting into the said watercourse at least one friction-reduction agent.

9 Claims, No Drawings

METHOD FOR LIMITING FRESHET LEVELS AND CONTROLLING FLOODS

FIELD OF THE INVENTION

The number of natural disasters due to floods has doubled in 10 years. In 2010, 178 million people have been victims of the phenomenon, which has increased, firstly, because of natural conditions and, secondly, because of population increase and urbanization.

BACKGROUND OF THE INVENTION

A number of instances of flooding have occurred in towns, due to rivers large and small bursting their banks, while other floodings have occurred because of high tides.

One can cite, as an example, the flooding of Prague by the Vltava, where forecasts anticipated a maximum rate of flow rate of 2900 $m^3$ per second, whereas the actual figure was around 6000 $m^3$ per second. The metro, for instance, was only restored to service after 6 months.

Successive development in towns/cities has created fixed river widths that it is practically impossible to change, which only enables minor corrective measures for their protection. Among these measures is upstream diversion towards agricultural land, which has been performed for the Mississippi, or the construction of reservoirs, of which the effectiveness is limited.

In the towns and cities themselves, architects construct flood-resistant buildings, or make provision for the walling-up of metro stations, evacuation plans and contingency plans. But the size of floodable metropolitan areas is such that the measures taken are only minor in relation to the phenomenon and the enormous reconstruction costs.

This is because underneath these cities are networks of sewers, tunnels, excavations and underground quarries that create channels of connection between vast surface areas that, in other times, were separated.

Lastly, there is no major solution for preventing disasters arising from exceptional floodings, such as one-in-one-hundred-year floods that can particularly affect cities.

Thus, there is a need for a new solution that attenuates the phenomena of flooding, and their consequences.

Document DE 19732106 describes a process allowing flooding to be limited. This process consists in causing explosions by means of explosive charges maintained within the river bed. The waves caused by these explosions accelerate the water flow. The process involves positioning potentially-dangerous explosive charges at locations that are unpredictable in terms of the current.

The Applicant has had the idea of injecting a friction-reduction agent into the watercourse, using the Toms effect. The implementation of the process via injection is thus facilitated, and eliminates the hazards of explosives.

Toms effect, which was discovered in 1946, and is otherwise called "drag reduction" enables one, with the same power, to increase the flow rate of a liquid by adding a friction-reduction agent such as, for example, clays, surface-active agents, or organic compounds such as water-soluble polymers.

The industrial applications of water-soluble polymers are currently in water conveyance in long-distance pipelines, with velocities of 2 to 3 meters per second and, in particular, in the petrochemicals industry, agriculture and mining in arid areas. To cite an example, document U.S. 2012/0214714 describes a hydraulic fracturing process by which water-soluble polymers are mixed into the fracturing fluid, so as to reduce the friction phenomena within closed pipelines.

More-anecdotal quantities are used to increase the speed of motor torpedo boats, of which the torpedoes themselves are cut-out with a water jet containing a water-soluble polymer.

Their industrial usage started in the seventies, and has been increasing regularly.

SUMMARY OF THE INVENTION

By applying the Toms effect to a flooding watercourse, the Registrant has researched a method allowing a faster flowing of the water to obtain a noteworthy result in the level of water in the event of flooding.

In a preferred form of implementation, the Applicant proposes to employ water-soluble polymers in rivers—wide and narrow—and/or tributaries as a friction-reduction agent, to promote the flow of water and thereby decrease the level of flooding.

Thus, the invention addresses a process for limiting the level of flooding of a watercourse, notably a wide river, a narrow river and/or one of their tributaries, consisting of injecting into the said watercourse at least one friction-reduction agent—advantageously a water-soluble polymer.

The invention is particularly advantageous for protecting highly-populated large towns and cities that have no means of protecting their architecture from exceptional flooding.

The water-soluble polymers injected can be in solid or liquid form. They will preferably be in powder form.

The injection of the water-soluble polymer consists in tipping the water-soluble polymer(s)—which will preferably be in powder form—directly into the watercourse(s), upstream of the town/city to be protected. This injection can be performed at the edge of or in the midst of the watercourse. In a preferred form of implementation, the water-soluble polymer is dispersed by a centrifugal pump and injected directly into the watercourse.

Generally, the water-soluble polymer will be stored in silos beside watercourses.

Water-soluble polymers of very high molecular weight are the most-effective compounds.

The water-soluble polymers will preferably be acrylamide-based. Among these polymers, copolymers prepared from the following monomers are particularly advantageous: acrylic acid; ATBS (2-acrylamido-2-methylpropane-sulfonic acid); diallyl dimethyl ammonium chloride (DADMAC); dialkylaminoethyl acrylate (ADAME); dialkylaminoethyl methacrylate (MADAME); their acidified or quaternized salts; N-vinyl pyrrolidon.

The water-soluble polymers will preferably be acrylamide-based and acrylic-acid-based copolymers, notably those containing between 50% and 90% molar of acrylamide.

The molecular weight of these acrylamide-based polymers will preferably be between 5 and 30 million g/mol, and even more preferably between 10 and 25 million g/mol.

Ethylene polyoxides are also effective, but their molecular weight is lower (6 to 10 million maximum), with a sensitivity to mechanical degradation and a higher cost price.

Water-soluble polymers are effective from watercourse flow rates of around 1.5 meters per second and, above all, of greater than 2 meters per second. Depending on the velocities, it is possible to attain a 30% load loss reduction with quantities of 50 to 100 parts per million. With higher quantities, the ceiling is reached at a 70% increase.

The quantities of water-soluble polymer injected into the river—wide or narrow—and/or its tributary is between 10 and 1000 ppm, and will be adjusted by a knowledgeable professional according to the level of flooding.

DETAILED DESCRIPTION OF THE INVENTION

Obviously, the application to the problem of flooding is new, and requires thorough studies taking account of flow rates and profiles. In particular, the measurement of a velocity over a distance does not take account of obstacles (bridges, narrowings, jammed objects, etc.), which strongly accelerate the velocity and create turbulence effects in which the instantaneous velocity is several times the average velocity.

One also has to take account of the fact that floodings are very different on plains, where the warning time is sufficient for taking action and the torrential flooding is very fast, with very considerable peaks. One can cite flooding on the Var at 3800 $m^3$ per second, whereas flooding on the Seine rarely exceeds 2200 $m^3$ per second. In certain cases, auxiliary phenomena—particularly wind—reduce or accelerate the water velocity.

Obviously, each case is particular, and a study involving both modeling and testing is necessary.

Furthermore, the addition of a chemical product into the river can have undesirable ecological effects. A thorough study of the problem will be necessary, taking account of the enormous stakes.

This is because while polyacrylamide by itself is not in any way toxic, a low residue of monomer (acrylamide) can be questionable. Fortunately, acrylamide is easily biodegradable, and the streaming on water-saturated surfaces should not constitute a pollution hazard for the water tables. This issue must be verified with objectivity.

The following example illustrates the invention and the resulting advantages.

City of Paris

The major floodings of the Seine that have occurred in Paris are the severe floodings of 1176, 1658 (8.96 m level) and 1740. But the most-spectacular flooding—because it was relatively recently—was that of January 1910, during which the level reached 8.42 m, compared with the normal average of 3.60 m. This flooding lasted 20 days, with a return to normal after 45 days. The flow rate observed was 2000 to 2200 $m^3$ per second.

The Seine by itself, upstream of its principal tributaries, is a small river that notably receives:

| | | |
|---|---|---|
| The Yonne | average 92 $m^3$ per sec | flooding 960 $m^3$ per sec |
| The Marne | average 110 $m^3$ per sec | flooding 650 $m^3$ per sec |
| The Aube | average 41 $m^3$ per sec | flooding 330 $m^3$ per sec |
| The Loing | average 18 $m^3$ per sec | flooding 315 $m^3$ per sec |
| The Eure | average 26 $m^3$ per sec | flooding 140 $m^3$ per sec |
| The Seine in Paris | average 450 $m^3$ per sec | flooding 2000 $m^3$ per sec |

The velocity of the Seine is, on average, 1 to 2 km per hour (0.3 to 0.6 m per sec). At the beginning of flooding, it increases to 4 km per hour (1.1 m per sec), stabilizing at 5-7 km per hour during flooding (1.4 to 1.9 m per sec). However, the instantaneous velocities can be practically double in narrower sections and depending on turbulences, which strongly decrease the flow rates. The flood reservoirs currently constructed absorb approximately 60 cm of flooding, without preventing it.

The use of a drag-reduction agent in amounts to be specified—around 50 to 100 ppm, would enable an increase in average flow rate of 20 to 30% at peak. Obviously, the quantities necessary seem enormous. With a flow rate of 2000 $m^3$ per second, at 100 ppm, one needs 0.2 tonnes of product per second, namely 720 tonnes per hour, 17,280 tonnes over 24 hours, and 172,800 tonnes over 10 days. However, the cost would by around 500 million euros—low in relation to the cost of a one-in-one-hundred-year flooding, also taking account of the fact that the 2000-$m^3$-per-second level can be exceeded in a catastrophic situation.

One can also cite the floodings of the Danube and the Inn which, in 2002, caused enormous damage estimated by the authorities at 7.5 billion euros. The evacuation of a part of the population is additional to this.

France's Barnier Law of 1995 made provision for a Prevention Plan for Flooding Hazards [Plan de Prévention pour les Risques d'Inondation (PPRI)] that plans a stoppage of public transport at 6.20 m, the evacuation of 850,000 people for 30 to 40 days, and the maintenance in-situ of 1.5 million people, probably without heating and electric power for 30 to 40 days. Additionally, the RATP [Régie Autonome des Transports Parisien, or Paris Public Transport Corporation] has planned for the construction of rubble walls around metro stations; at a certain height and depending on network shortcuts, the metro system could be totally flooded.

In 1910, there were 65,000 electrical power customers in Paris. Today, and taking account of the more-sophisticated electronics employed, which are more-sensitive to water than the power grid of 1910, the time required for replacement of facilities in a situation of equipment shortages is unknown.

The other problem is the evacuation of automotive vehicles to non-floodable areas, with return journeys over large distances in flooded areas and without public transport systems.

Paris—Roll-Out of the Project

A study with simulation of the project will enable the parameters to be specified:
  effectiveness of the product at different doses;
  effectiveness at different velocities;
  effectiveness at different velocities, taking account of turbulences;
  advantageous points of injection;
  advantageous time window for injection.

It will probably come to the fore that the injections have to be done at the tributaries, taking account of the fact that the dissolution time for a polyacrylamide in powder form is approximately one hour. The injection program itself will be variable, according to the duration, the flow rate and the level.

The storage of the product in silos similar to grain silos poses no problem, but it will be necessary to periodically verify the aging of the product, which should be usable for more than 10 years in the case of high-quality polymers.

Dispersal in rivers can be done by dispersal in a cone of water raised by centrifugal pumps. A centrifugal pump capable of 500 $m^3$ per hour can disperse 5 tonnes of product per hour directly into the river.

Obviously, this possible new development must undergo optimization studies taking account of the fact that the process itself has been validated by past studies and operations with much lower flow rates.

The invention claimed is:

1. A process for limiting the level of flooding of a watercourse consisting of injecting into the said watercourse at least one friction-reduction agent in the form of a water-soluble polymer, wherein the quantity of the water-soluble polymer injected into the watercourse is between 10 and 1000 ppm; wherein the watercourse comprises at least one of a wide river, a narrow river, and a tributary to a river.

2. The process in accordance with claim 1, characterized by the fact that the watercourse has a velocity greater than 1.5 meters per second.

3. The process in accordance with claim 1, characterized by the fact that the friction-reduction agent in the form of a water-soluble polymer is injected upstream of the site to be protected.

4. The process in accordance with claim 1, characterized by the fact that the water-soluble polymer is in powder form.

5. The process in accordance with claim 1, characterized by the fact that the water-soluble polymer is dispersed by a centrifugal pump and injected directly into the watercourse.

6. The process in accordance with claim 1, characterized by the fact that the water-soluble polymer is an acrylamide-based polymer or an ethylene polyoxide.

7. The process in accordance with claim 1, characterized by the fact that the water-soluble polymer is an acrylamide-based polymer obtained by co-polymerization of the acrylamide with at least one of the following monomers: acrylic acid; ATBS (2-acrylamido-2-methylpropanesulfonic acid); diallyl dimethyl ammonium chloride (DADMAC); dialkylaminoethyl acrylate (ADAME); dialkylaminoethyl methacrylate (MADAME); their acidified or quaternized salts; N-vinyl pyrrolidon.

8. The process according to claim 1, characterized by the fact that when the water-soluble polymer is an acrylamide-based polymer, its molecular weight is between 5 and 30 million g/mol.

9. The process in accordance with claim 1, characterized by the fact that the watercourse has a velocity greater than 2 meters per second.

* * * * *